United States Patent
Butterfield

[15] 3,671,451
[45] June 20, 1972

[54] FLUORESCENT COMPOSITIONS

[72] Inventor: Boydston Lewis Butterfield, East Amwell Township, Hunterdon County, N.J.

[73] Assignee: American Cyanamid Company, Stamford, Conn.

[22] Filed: March 27, 1968

[21] Appl. No.: 716,318

[52] U.S. Cl..............................252/301.2, 106/21, 106/28, 106/32, 106/253, 117/1, 117/1.5, 117/33.5 R, 117/33.5 T, 96/88
[51] Int. Cl.........................................C09k 1/00, F21k 2/00
[58] Field of Search......................................106/19–32, 308, 106/253; 252/301.2, 301.3, 401; 117/33.5 E, 33.5 T, 33.5 R, 1, 1.5, 33.5 A, 33.5 L, 33.5 C, 33.5 CM, 33.5 CP; 96/88; 260/518

[56] References Cited

UNITED STATES PATENTS 3,153,667  10/1964  Smith......................................260/518

Primary Examiner—Joan B. Evans
Attorney—Theodore C. Virgil

[57] ABSTRACT

Compositions useful for imparting fluorescent properties to surfaces comprising at least one compound of the formula:

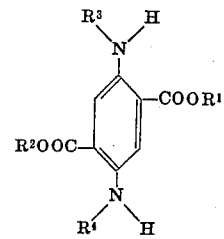

wherein $R^1$ and $R^2$ represent individually alkyl of 1–18 carbons; $R^3$ and $R^4$ each represent a monocyclic or bicyclic aryl radical.

9 Claims, No Drawings

FLUORESCENT COMPOSITIONS

This invention relates to the provision of articles having fluorescent surfaces and to the compositions useful for imparting fluorescent properties to these surfaces. The compounds useful for such purposes are esters of 2,5-diarylaminoterephthalic acids represented by the formula (I):

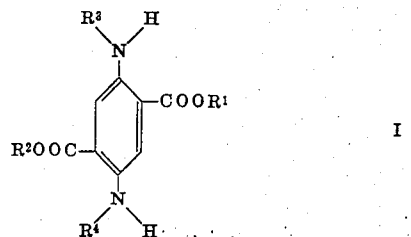

wherein $R^1$ and $R^2$ represent individually alkyl of 1–18 carbons; $R^3$ and $R^4$ each represent a monocyclic or bicyclic aryl radical.

It is understood that in the above, the term aryl may designate a phenyl, naphthyl or heterocyclic radical such as quinolyl, pyridyl, etc. which may contain various substituents such as lower alkyl, lower alkoxy, diloweralkylamino, halo, nitro, lower(halo-alkyl) such as trifluoromethyl, lower alkanamido, e.g., acetamido or the like.

Fluorescence, or the emission by certain materials of light energy of one wavelength when irradiated by "exciting light" of a different and usually lower wavelength, is a well-known phenomenon. Also, well-known is the phenomenon of phosphorescence, i.e., persistence of the luminescence after removal of the source of exciting radiation. In the past, various practical applications of fluorescent phenomena have been proposed with varying degrees of success. The importance and the need for organic materials with a variety of visible colors, which emit visible light in certain wavelength ranges when excited by ultraviolet light and which are stable, has recently increased. Examples of applications where such properties are useful are numerous. Thus, in the illumination field, screens or panels giving various shades of light under excitation are extremely useful, not only for general illumination, but for producing novel or theatrical effects and signs.

Compounds which fluoresce in desirable shades are further useful in printing inks, paints, enamels, finishes and other surface coating compositions where it is desired to have one appearance by daylight or visible light and either a similar or even a completely different appearance or color upon excitation with ultraviolet light.

Ink compositions containing the organic fluorescers are useful for imparting fluorescent properties to various kinds of surfaces in various types of designs, etc. This may be for purposes of decoration, identification or security of documents, etc., and for the prevention of counterfeiting. Thus, for example, if an ink containing a particular fluorescer is used for printing documents, the document may have one appearance when viewed under visible light and a different appearance when viewed under ultraviolet light due to the fluorescent effect of the surface containing the fluorescent material.

However, depending on the fluorescer which is used in the ink for printing the document, the appearance of the printing on the document under ultraviolet excitation may be the same color as that which is visible under ordinary conditions, provided the color of the fluorescence is the same or similar to the visible color of the compound when viewed under visible light. Such ink compositions are thus especially useful for security purposes and counterfeiting detection processes. They are also especially useful for imparting fluorescent properties to various types of surfaces particularly in certain types of designs. These designs may be in the form of printed letters or numerals. The printing with inks containing fluorescent materials may be done using machine-readable format and such applications are extremely important in that these can be used for electronic or mechanized processes involving sensing or scanning devices sensitive to light of the particular wavelengths of the printed material. Documents which are thus printed could serve as the basis of computerized accounting, billing and recording systems for general business use.

A further example is in marking or identifying documents or items which are to be handled or manipulated mechanically by machines having fluorescence-sensing devices. Thus, items imprinted with printing inks containing fluorescent materials can pass through a fluorescent sensing device which activates mechanical means for manipulating or handling the items automatically. A practical application is the machine-sorting or positioning of mail. The mail may be marked with fluorescent ink, as such, or the fluorescer may be used in the ink used to imprint the postage stamps. A very useful practical application is in the ink used in a postage meter machine. Thus, if the ink used for postage metering contains the fluorescer the mail can be sent through a sensing device which can recognize it as having been metered and which, in addition, on the basis of the fluorescent marking, properly positions the mail for cancelling.

For such practical purposes fluorescent materials with a wide range of color under normal and ultraviolet lighting conditions and the ability to fluoresce in the solid state, would be useful. In addition, for certain purposes it is especially useful that the color under visible light be of a certain wavelength range in relation to the wavelength range of emitted fluorescent light. For some purposes, it is desired that the fluorescent material be colorless when viewed under visible light and, under UV, emit fluorescent light in a certain color range. For other purposes, however, it is desired that the fluorescent material have a similar color such as bright yellow, orange or red when viewed under either ultraviolet or visible light. Fluorescers with such properties can be used to make up a visibly colored ink which at the same time affords fluorescent properties. Thus, other colored nonfluorescent pigments are not needed to achieve the desired color under either visible or ultraviolet light.

For various purposes it is required that the fluorescence be of a certain color, i.e., within a certain wavelength region. It may be noted that many known compounds fluoresce in the yellow, green, blue or violet region and are colorless under visible light. For use in printing inks which may be applied to paper, fluorescence in a region higher than about 485 millimicrons is necessary if the printing is to be viewed by a photo sensing device, since most paper contains organic brighteners or optical bleaching agents which fluoresce in the blue region. Thus, unless this requirement is met, there is likely to be only a small contrast between the fluorescence of the printing ink and that of the brighteners in the paper, and the machine would have difficulty in distinguishing between printed and background fluorescence.

The present invention is based on the discovery that esters of 2,5-diarylaminoterephthalic acid as defined above are useful as organic fluorescers which, even in the solid state, exhibit bright colors in the yellow, orange and red range when viewed under ultraviolet or visible light.

In general, the color of the fluorescence emitted by these compounds in the solid form when excited by UV light is very similar to the color exhibited when viewed under visible light.

Surprisingly, though the ester derivatives of the substituted 2,5-diarylaminoterephthalic acids of Formula I are suitable to achieve the desirable visible and fluorescent color characteristics, the acids from which they are prepared, do not fluoresce significantly, and they cannot be used as fluorescers in the processes and compositions of the invention.

A convenient method for the preparation of the compounds of Formula I involves first the formation of a dialkyl succinylsuccinate by condensation of 2 moles of a dialkyl succinate with 4 moles of a sodium alkylate in a suitable solvent such as xylene. The dialkyl succinylsuccinate is condensed with an aryl amine followed by oxidation to yield a diarylamino terephthalic ester.

In practice, depending on the intended purpose, mixed esters, e.g., methyl and ethyl esters, may be suitable, and for such preparations, the alkyl groups of the succinate and the alkylate may be different. Thus, the methyl, ethyl mixed ester is prepared using a dialkyl succinylsuccinate prepared from 2 moles of diethyl succinate condensed with 4 moles of sodium methylate. However, if an ester with the same alcohol groups is desired, then the alkyl radical of the sodium alkylate should correspond with the alkyl radical of the dialkyl succinate. By using appropriately substituted anilines or other arylamines in the condensation step with the dialkyl succinylsuccinate correspondingly substituted 2,5-diarylamino derivatives may be obtained.

As stated above, the compositions of this invention may be used in a large variety of applications. Thus, they may be used in lighting panels, in plastic compositions, in inks, paints and other coating compositions, and the like, where a surface of a certain visible color is desirable in addition to emission of visible light of various colors upon exposure to UV light. They may be used in applications both where it is desirable to produce a composition which has one appearance by daylight and a completely different appearance or color under UV light and in compositions where it is desirable to have a given color by daylight and a similar color under UV or black light.

Examples of particularly important applications are in luminescent compositions for identification or machine-sensing purposes. A practical application involves, for example, the use of the fluorescers for the preparation of inks used in detection and sensing systems, for facing and cancellation of stamps or for sorting and positioning for cancellation of pieces of mail. Of special interest is the application in inks for postage metering devices whereby, for example, the metering device imprints the mail item in a certain color with the amount of postage paid; the mail, then, when it is in among other mail items to be sorted and cancelled, on being subjected to UV light emits from the imprint fluorescent light of a given wavelength to activate sensing devices. The compositions of this invention are particularly useful for such a purpose in that the wavelength of fluorescence is definitely distinct from that of brightening agents generally occurring in paper.

As stated above, an application of the solid organic fluorescers of the invention which is of great interest is in postage meter ink formulations. In such an application, a self-pigmented ink is possible. The solid fluorescers in suspension in the ink vehicle and also in the dry imprint, impart visible color, and in addition, without the presence of any other pigment impart the necessary fluorescent properties to the ink imprint. Fluorescent ink compositions, of course, when used on mailing units make possible the use of mechanical devices for sorting, positioning, cancelling, etc.

Such formulations normally are made up in a drying varnish vehicle using a formulation with mineral spirits which gives an ink with the consistency which is required for the intended purpose.

A combination of components to give a formulation of general application in postage metering equipment is as follows:

25 parts of the organic fluorescer
From 5 to 20 parts of a lithographic varnish of heavy consistency (No. 1 to NO. 6 Lithographic Varnish)
From 0 to 50 parts of a light viscosity lithographic varnish (No. 4/0 to No. 1 Lithographic Varnish)
From 5 to 25 parts of a light viscosity mineral oil The proportion of the heavy and light lithographic varnishes may be adjusted to result in a final consistency suitable for the particular meter device in which the ink is to be used. The ink may be in the form of a comparatively thin liquid or it may even have the consistency of a thick semi-solid. Conventional ink materials may be used to achieve the desired viscosity, which may range overall from about 5 centipoises as a lower limit to about 10,000 centipoises as an upper limit. The lithographic varnish used is well known in the ink trade.

From 0 to 5 parts of lecithin, for each 24 to 25 parts of the fluorescer, is sometimes included to improve consistency properties.

In addition, it is sometimes advantageous to include from 0.01 to about 2 percent of a drying inhibitor such as methyl salicylate. This serves the purpose of inhibiting the drying of the varnish in the mechanical equipment and preventing clogging. After the ink imprint has been made on the item of mail, the inhibitor, such as methyl salicylate, evaporates and the varnish drying effect can then proceed rapidly.

The invention is further illustrated by the examples which follow.

EXAMPLE 1

Procedure for Preparation of Diethyl 2,5-di-p-toluidinoterephthalate

To 256 grams (1.0 mole) of diethyl succinylsuccinate and 250 grams (2.33 moles) of p-toluidine was added 1,500 grams of xylene and 375 grams of acetic acid. The mixture was heated to 100°–110° C. and held there with stirring for 2 hours. The mixture was then cooled to 90°–100° C. and air was passed into the mixture to oxidize the dihydro intermediate. The water which formed was removed by distillation. The air oxidation was continued for 8 hours until completion of reaction was shown by the disappearance of the 9.3 micron band in a Nujol mull of a sample isolated from the reaction mass by drowning and washing with ethanol indicating oxidation of the dihydro compound was complete. The mixture was then cooled slowly to room temperature and the product filtered, washed with 2,000 ml. of acetone and dried in a steam oven overnight. Yield 400 grams (93 percent), M.P. 187°–189° C. Product may be purified further by recrystallization from dimethylformamide.

EXAMPLE 2

Using the procedure as described in Example 1, but applying various substituted aniline derivatives, additional substituted derivatives of the diethyl ester of 2,5-dianilinoterephthalic acid were prepared. In the table which follows are shown the products formed and the visible and fluorescent colors thereof. All the products shown were purified by recrystallization from xylene.

TABLE

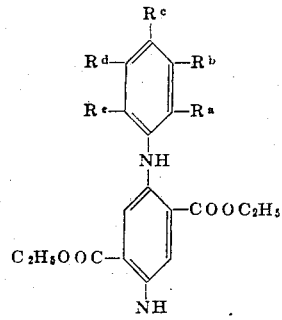

Table —Continued

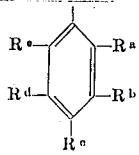

| $R^a$ | $R^b$ | $R^c$ | $R^d$ | $R^e$ | Visual color | Color of fluorescence |
|---|---|---|---|---|---|---|
| H | H | $N(CH_3)_2$ | H | H | Dark red | Weak, bluish red. |
| H | Cl | $CH_3$ | H | H | Red | Strong, red. |
| H | H | Cl | H | H | Reddish orange | Strong, red. |
| Cl | H | H | H | H | Bright orange | Strong, yellow-orange. |
| H | H | $OCH_3$ | H | H | Light red | Strong, red-orange. |
| $CH_3$ | H | H | H | $CH_3$ | Yellow orange | Strong, yellow-orange. |
| H | $CH_3$ | $CH_3$ | H | H | Red | Bright red. |
| H | $CH_3$ | H | H | H | Light orange | Bright orange. |
| $CH_3$ | H | H | H | H | Red | Strong, red. |
| $CH_3$ | H | $CH_3$ | H | $CH_3$ | Orange | Bright orange. |
| Cl | H | $CH_3$ | H | H | Light orange | Strong, reddish-orange. |
| $C_2H_5$ | H | H | H | $C_2H_5$ | Light orange | Very strong, yellow-orange. |

EXAMPLE 3

Preparation of the di-n-lauryl ester of 2,5-di-p-toluidinoterephthalic Acid

To 50 grams of a mixed methyl-ethyl ester of 2,5-di-p-toluidinoterephthalic acid was added 100 grams of lauryl alcohol and 2 ml. of concentrated sulfuric acid. The mixture was heated at the reflux temperature for 24 hours, the lower boiling alcohols which formed being removed by distillation. After cooling, the solid product was isolated by filtration and washed with alcohol and acetone. This was reslurried in boiling methanol and finally recrystallized from ethanol giving a product with a melting point of 101° to 102° C. This product, by visible light, showed a reddish-orange color and upon exposure to UV light exhibited a bright orange fluorescence.

The corresponding dibutyl ester was prepared in an analogous fashion substituting an equivalent amount of butyl alcohol with lauryl alcohol. The product also showed a yellow-orange color by visible light and bright orange fluorescence upon exposure to UV light.

EXAMPLE 4

Preparation of the Mixed Methyl-ethyl Esters of Substituted 2,5-Diarylaminoterephthalic Acids A 1 mole portion of the mixed methyl-ethyl ester of succinylsuccinic acid is reacted with somewhat more than a 2 mole portion (about 10 percent excess) of the amino compound in xylene at elevated temperatures in the presence of a small amount of acetic acid as an acid catalyst, while simultaneously passing air into the mixture to effect oxidation of the dihydroterephthalic acid derivative as it is formed.

As an example, the preparation using 3-amino-N-ethylcarbazole as the amine, follows:

To 400 ml. xylene was added 30 grams of the mixed ester (methyl-ethyl) of succinylsuccinic acid, 46 grams of 3-amino-9-ethylcarbazole and 50 ml. of acetic acid. The mixture was heated to 110° C. for 3 hours during which time air was passed in (1 to 1.5 liters of air per minute). The water formed from the reaction was removed by distillation. As the water was removed, the temperature remained somewhat constant, but as the reaction became complete and all the water was removed, the temperature was allowed to increase to about 125° C. Water was then added to the mixture and the xylene removed by steam distillation. The residue was stirred with 600 ml. 95 percent ethanol and the solid isolated by filtration, washed and dried. There resulted a red solid melting at 240°–242° C. which shows a red fluorescence.

The above procedure was repeated using a variety of aromatic amines as listed below, giving solid products with colors ranging from yellow through red. In some instances, the ratio of xylene to starting material was varied to obtain complete solution of the starting material. Also, in some instances the steam distillation to remove xylene was not carried out if the product precipitated directly from the mixture. The products may be further purified by recrystallization from xylene or acetic acid.

Using the following listed aromatic amines, additional fluorescent mixed esters may be prepared by the foregoing procedure:

| | |
|---|---|
| 3-aminoquinoline | 2,5-dichloroaniline |
| o, m and p-toluidine | 3,4-dichloroaniline |
| o and p-anisidine | 2,4-dichloroaniline |
| o, m and p-chloroaniline | 2,3-dichloroaniline |
| p-ethylaniline | 3,5-dichloroaniline |
| p-butylaniline | 4-aminoacetanilide |
| p-dodecylaniline | 3-bromoaniline |
| 2,5-xylidine | 3-trifluoromethylaniline |
| 3,4-xylidine | 3-chloro-4-toluidine |
| 2,4-xylidine | 2-naphthylamine |
| 2,3-xylidine | 1-naphthylamine |
| 3,5-xylidine | |

EXAMPLE 5

Postage Meter Ink Formulation

An ink formulation is prepared using the following components:

25 parts of the diethyl ester of 2,5-di-p-toluidinoterephthalic acid (From Example 1)
25 parts of a viscous lithographic varnish (No. 4 Transparent Lithographic Varnish)
1 part of Lecithin (Soya Lecithin – Type S).
1 part of methyl salicylate
25 parts of light lithographic varnish (4/0 Lithographic Varnish)
23 parts of light mineral oil (Magie Bros. No. 470 Oil)

The luminescer, the heavy varnish and lecithin are combined and ground well on a three-roll ink mill. The methyl salicylate, the light varnish and the light mineral oil, previously blended, are then added. The total formulation is then mixed and blended until uniform.

(The lithographic varnish used in the above formula is a drying type varnish. The methyl salicylate is included as a drying inhibitor to prevent too rapid drying of the varnish.)

The above formulation may be used in postage meters for imprinting mail items with the cancellation and the amount of postage paid. When used in this way, the imprint appears red in color; when viewed under UV light, it fluoresces a red color, the emitted light having a maximum at a wavelength of 601.7 millimicrons.

EXAMPLE 6

A red ink giving a red imprint viewed in daylight and which fluoresces red under ultraviolet light is prepared by milling diethyl 2,5-p-toluidinoterephthalate into a commercial ink vehicle (IPIR–592 Vaposet) at a 5 percent concentration.

The visible color may be modified by the addition of other colored pigments.

EXAMPLE 7

Using the compound of Example 1, fluorescent poly(methyl-methacrylate) panels were prepared containing 1 percent, 3 percent, 5 percent and 10 percent of the fluorescer. For this purpose, the solid fluorescer was milled into the poly(methyl-methacrylate) which was then compression-molded into panels.

These panels in daylight appeared orange by reflected light and yellowish orange by transmitted light. When viewed in ultraviolet light, the panels fluoresced a brilliant yellowish orange color.

A similar formulation using 10 percent 2,5-di-p-chloroanilinoterephthalic acid diethyl ester exhibited a brilliant yellow color observed in daylight and under UV light.

EXAMPLE 8

Diethyl 2,5-di-p-toluidinoterephthalate is incorporated at a 10 percent by weight concentration into polypropylene (Hercules Profax 6501 Polypropylene). Viewed in daylight the plastic appears bright red. It also fluoresces a bright red color under ultraviolet light.

EXAMPLE 9

A pink-tinted paint composition is prepared by thoroughly mixing 2.5 grams of diethyl di-p-toluidinoterephthalate into 7.5 grams of a white paint having the following formulation:

|  | Percent |
|---|---|
| Titanium dioxide | 41.0 |
| Zinc oxide | 2.4 |
| Linseed soya-alkyd resin | 23.9 |
| Mineral spirits | 30.4 |
| Driers | 2.3 |

A drawdown of this paint shows a light red color which under ultraviolet light had a brilliant red appearance.

EXAMPLE 10

A sample of the fluorescer identified as a mixed methyl-ester of 2,5-di-p-toluidinoterephthalic acid was blended with wool soap in the ratio of one part of ester with 10 parts of soap. The blending was carried out in a Waring Blender and the blended material was then compacted into pencil-thick crayons by pressing through a tube of appropriate size.

The colored wax crayons gave printings with a red color by daylight and with a bright red fluorescence viewed under ultraviolet light.

I claim:

1. A method for imparting fluorescent properties to an object comprising applying to the object a substituted aminoterephthalate represented by the formula:

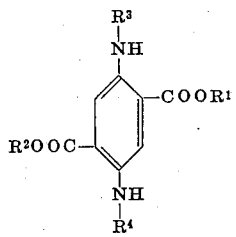

where $R^1$ and $R^2$ individually represent an alkyl radical of 1–18 carbons and $R^3$ and $R^4$ are each monocyclic or bicyclic aryl in an amount effective to impart fluorescent properties to such object.

2. The object resulting from the process of claim 1 having color under visible light and adapted to fluoresce during exposure to UV radiation.

3. The method of claim 1 wherein the aminoterephthalate is the diethyl ester of 2,5-di-p-toluidinoterephthalic acid.

4. A coating or printing composition adapted to form a fluorescent coating when deposited upon a solid substrate, the composition containing as a fluorescent component at least one substituted amino-terephthalate represented by the formula:

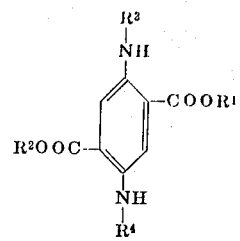

where $R^1$ and $R^2$ individually represent an alkyl radical of 1–18 carbons and $R^3$ and $R^4$ are each monocyclic or bicyclic aryl in an amount effective to impart fluorescent properties to such object.

5. The composition of claim 4 wherein the composition is an ink formulation containing, on a weight basis, about 25 parts of fluorescer, about 5–20 parts of heavy lithographic varnish, about 0–50 parts of light lithographic varnish and about 5–25 parts of light mineral oil.

6. The composition of claim 4 wherein the composition is a coating formulation comprising a resin and a liquid vehicle.

7. The composition of claim 5 wherein the terephthalate is the diethyl ester of 2,5-di-p-toluidinoterephthalic acid.

8. A polymeric composition comprising a polymeric substrate and a fluorescent component represented by the formula:

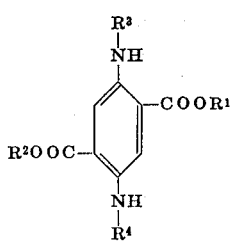

where $R^1$ and $R^2$ individually represent an alkyl radical of 1–18 carbons and $R^3$ and $R^4$ are each monocyclic or bicyclic aryl in an amount effective to impart fluorescent properties thereto.

9. The composition of claim 8 wherein the component is the diethyl ester of 2,5-di-p-toluidinoterephthalic acid.

* * * * *